(12) United States Patent
Feng et al.

(10) Patent No.: US 11,543,911 B2
(45) Date of Patent: Jan. 3, 2023

(54) DRIVING METHOD, DRIVING CIRCUIT AND TOUCH-DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Yilin Feng, Beijing (CN); Wei Sun, Beijing (CN); Wenchao Han, Beijing (CN); Zhaohui Meng, Beijing (CN); Xinle Wang, Beijing (CN); Yan Yang, Beijing (CN); Lianghao Zhang, Beijing (CN); Xiaoyang Shen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 225 days.

(21) Appl. No.: 16/768,292

(22) PCT Filed: Apr. 30, 2019

(86) PCT No.: PCT/CN2019/085194
§ 371 (c)(1),
(2) Date: May 29, 2020

(87) PCT Pub. No.: WO2020/220259
PCT Pub. Date: Nov. 5, 2020

(65) Prior Publication Data
US 2021/0232285 A1   Jul. 29, 2021

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .... G06F 3/04166; G06F 3/044; G06F 3/0412; G06F 3/0446; G06F 3/0416
(Continued)

(56) References Cited

U.S. PATENT DOCUMENTS

| 8,319,737 B2 | 11/2012 | Noguchi et al. |
| 9,111,808 B2 | 8/2015 | Sogabe et al. |

(Continued)

FOREIGN PATENT DOCUMENTS

| CN | 101556783 | 10/2009 |
| CN | 102736788 | 10/2012 |

(Continued)

OTHER PUBLICATIONS

Office Action for corresponding Chinese application No. 201980000577.3 and its English translation, dated May 5, 2022.

*Primary Examiner* — Farhana A Hoque
(74) *Attorney, Agent, or Firm* — Leason Ellis LLP (57) ABSTRACT

A driving method, a driving circuit and a touch-display apparatus are provided. The driving method includes providing a gate driving signal to a gate line, providing a pixel voltage to a data line, and providing a common electrode driving signal to a common electrode, wherein a pixel display operation is performed based on the gate driving signal, the pixel voltage, and the common electrode driving signal, and simultaneously, a touch detection operation is performed based on the common electrode driving signal. The driving method realizes the effect of simultaneously performing a pixel display operation and a touch detection operation, and solves the problem that the pixel display operation of the touch-display apparatus is affected in the touch detection stage.

15 Claims, 5 Drawing Sheets

(58) Field of Classification Search
USPC .......................................................... 324/600
See application file for complete search history.

(56) References Cited

U.S. PATENT DOCUMENTS

| | | | |
|---|---|---|---|
| 9,690,416 B2 | 6/2017 | Yao et al. | |
| 9,851,824 B2 | 12/2017 | Kida et al. | |
| 9,939,938 B2 * | 4/2018 | Qin | ........................ G06F 3/0446 |
| 10,073,562 B2 * | 9/2018 | Mo | ...................... G02F 1/13439 |
| 10,372,248 B2 | 8/2019 | Endo et al. | |
| 2014/0085345 A1 * | 3/2014 | Ma | ........................ G09G 3/3696 |
| | | | 345/89 |
| 2017/0235414 A1 * | 8/2017 | Ding | ................. G02F 1/136286 |
| | | | 345/174 |
| 2018/0018054 A1 | 1/2018 | Kimura et al. | |

FOREIGN PATENT DOCUMENTS

| | | |
|---|---|---|
| CN | 102760718 | 10/2012 |
| CN | 103513808 | 1/2014 |
| CN | 103698927 A | 4/2014 |
| CN | 106598334 A | 4/2017 |
| CN | 107967080 | 4/2018 |

\* cited by examiner

DRIVING METHOD, DRIVING CIRCUIT AND TOUCH-DISPLAY APPARATUS

CROSS-REFERENCE TO RELATED PATENT APPLICATIONS

The present application is a U.S. National Phase Application under 35 U.S.C. § 371 of International Patent Application No. PCT/CN2019/085194, filed Apr. 30, 2019, the present disclosure of which is incorporated herein by reference in its entirety as part of the present disclosure.

TECHNICAL FIELD

Embodiments of the present disclosure generally relate to a field of touch-display, and more particularly, to a touch-display apparatus, a driving method thereof, and a driving circuit thereof.

BACKGROUND

As an input medium, a touch-display apparatus is currently a relatively simple and convenient man-machine interaction means. In the touch-display apparatus, it is usually necessary to use a driving method or a driving circuit so that a display operation and a touch detection operation do not interfere with each other. Therefore, how to design and prepare a more optimized driving method, driving circuit and touch-display apparatus is a focus of this field.

SUMMARY

According to at least one embodiment of the present disclosure, there is provided a driving method for driving a touch-display apparatus, the method comprising: providing a gate driving signal to gate lines, providing pixel voltages to data lines, and providing a common electrode driving signal to common electrodes, wherein a pixel driving is performed (i.e., a pixel display operation is performed) based on the gate driving signal, the pixel voltages, and the common electrode driving signal; and during the pixel display operation, a touch detection operation is simultaneously performed based on the common electrode driving signal.

For example, in the driving method provided by an embodiment of the present disclosure, the common electrode driving signal satisfies a voltage required for the pixel display operation and the signal waveform required for the touch detection operation.

For example, in the driving method provided by an embodiment of the present disclosure, the common electrode driving signal includes a sine wave signal or a cosine wave signal.

For example, in the driving method provided by an embodiment of the present disclosure, an amplitude of the sine wave signal or the cosine wave signal ranges from 0.01V to 1.2V.

For example, in the driving method provided by an embodiment of the present disclosure, the frequency of the sine wave signal or the cosine wave signal is greater than a preset frequency.

For example, in the driving method provided by an embodiment of the present disclosure, the common electrodes of the touch-display apparatus comprise a plurality of rows of lateral electrodes and a plurality of columns of longitudinal electrodes, wherein the gate driving signal is provided to the gate lines row by row, and the pixel voltages are provided to the data lines; an output signal of the plurality of rows of lateral electrodes is detected row by row, and a touch detection operation for the plurality of rows of lateral electrodes is performed based on the detected output signal; an output signal of the plurality of columns of longitudinal electrodes is detected column by column, and a touch detection for the plurality of columns of longitudinal electrodes is performed based on the detected output signal.

For example, in the driving method provided by an embodiment of the present disclosure, the common electrodes of the touch-display apparatus comprise a plurality of rows of lateral electrodes and a plurality of columns of longitudinal electrodes, wherein the gate driving signal is provided to the gate lines row by row, and accordingly the common electrode driving signal is provided to the plurality of rows of lateral electrodes row by row; the pixel voltages are provided to the data lines; and when the common electrode driving signal is provided to the plurality of rows of lateral electrodes row by row, an output signal of the plurality of columns of longitudinal electrodes is detected, and the touch detection operation is performed based on the detected output signal.

For example, in the driving method provided by an embodiment of the present disclosure, a common electrode driving signal is obtained by: performing a phase modulation on an original digital electrical signal using a carrier wave to obtain the common electrode driving signal.

For example, in the driving method provided by an embodiment of the present disclosure, performing the touch detection operation based on the detected output signal comprises: recovering the detected output signal into a digital electrical signal through a phase demodulation; performing the touch detection operation based on a difference between a number or a density of high and low levels included in the recovered digital electrical signal and a number or a density of high and low levels included in the original digital electrical signal.

For example, in the driving method provided by an embodiment of the present disclosure, the carrier wave includes a sine wave signal or a cosine wave signal.

According to at least one embodiment of the present disclosure, there is also provided a driving circuit for driving a touch-display apparatus, the driving circuit including: a driving sub-circuit, configured to provide a gate driving signal to gate lines, to provide pixel voltages to data lines, to provide a common electrode driving signal to common electrodes, wherein pixel driving is performed based on the gate driving signal, the pixel voltages, and the common electrode driving signal, and a touch detection operation is simultaneously performed based on the common electrode driving signal.

For example, in the driving circuit provided in one embodiment of the present disclosure, the common electrode driving signal satisfies a voltage required for the pixel display operation and the signal waveform required for the touch detection operation.

For example, in the driving circuit provided in one embodiment of the present disclosure, the common electrode driving signal includes a sine wave signal or a cosine wave signal.

For example, in the driving circuit provided in one embodiment of the present disclosure, an amplitude of the sine wave signal or the cosine wave signal ranges from 0.01V to 1.2V.

For example, in the driving circuit provided in one embodiment of the present disclosure, the frequency of the sine wave signal or the cosine wave signal is greater than a preset frequency.

For example, in the driving circuit provided in one embodiment of the present disclosure, the common electrodes of the touch-display apparatus comprise a plurality of rows of lateral electrodes and a plurality of columns of longitudinal electrodes, wherein the driving sub-circuit is further configured to: provide the gate driving signal to the gate lines row by row, and provide the pixel voltages to the data lines; detect an output signal of the plurality of rows of lateral electrodes row by row, and perform a touch detection operation for the plurality of rows of lateral electrodes based on the detected output signal; and detect an output signal of the plurality of columns of longitudinal electrodes column by column, and perform a touch detection for the plurality of columns of longitudinal electrodes based on the detected output signal.

For example, in the driving circuit provided by an embodiment of the present disclosure, the common electrodes of the touch-display apparatus comprise a plurality of rows of lateral electrodes and a plurality of columns of longitudinal electrodes, wherein the driving sub-circuit is further configured to: provide the gate driving signal to the gate lines row by row, and accordingly provide the common electrode driving signal to the plurality of rows of lateral electrodes row by row; provide the pixel voltages to the data lines; and when the common electrode driving signal is provided to the plurality of rows of lateral electrodes row by row, detect an output signal of the plurality of columns of longitudinal electrodes, and perform the touch detection operation based on the detected output signal.

For example, in the driving circuit provided in one embodiment of the present disclosure, the modulator further comprises a modulator configured to phase modulate an original digital electrical signal using a carrier wave to obtain the common electrode driving signal.

For example, in the driving circuit provided by one embodiment of the present disclosure, the driving circuit further comprises a demodulator configured to recover the detected output signal into a digital electrical signal through a phase demodulation; wherein the driving sub-circuit is further configured to: perform the touch detection operation based on a difference between a number or a density of high and low levels included in the recovered digital electrical signal and a number or a density of high and low levels included in the original digital electrical signal.

For example, in the driving circuit provided by an embodiment of the present disclosure, the carrier wave includes a sine wave signal or a cosine wave signal.

According to at least one embodiment of the present disclosure, there is also provided a touch-display apparatus for realizing a touch detection operation and a display operation, which comprises a driving circuit as described above.

BRIEF DESCRIPTION OF THE DRAWINGS

In order to explain the technical solution of the embodiments of the present disclosure more clearly, the following will briefly introduce drawings of the embodiments of the present disclosure. Obviously, the drawings in the following description only refer to some embodiments of the present disclosure, and not to the limitations of the present disclosure.

DETAILED DESCRIPTION

In order to make the purpose, technical solution and advantages of the embodiments of the present disclosure more clear, the technical solution of the embodiments of the present disclosure will be clearly and completely described with reference to the drawings of the embodiments of the present disclosure as follows. Obviously, the described embodiments are some embodiments of the present disclosure, and not all embodiments. Based on the described embodiments of the present disclosure, all other embodiments obtained by those skilled in the art without inventive labor are within the protection scope of the present disclosure.

Unless otherwise defined, technical terms or scientific terms used in this disclosure shall have the ordinary meaning understood by those with ordinary skills in the field to which this disclosure pertains. The words "first", "second" and the like used in the disclosure do not indicate any order, quantity or importance, but are only used to distinguish different components. Similarly, similar words such as "a", "an" or "the" do not indicate a limitation of quantity, but rather indicate a presence of at least one. Similar words such as "comprise" or "include" indicate that elements or articles appearing before the word cover elements or articles listed after the word, and do not exclude other elements or articles. Similar words such as "connect to" or "connect with" are not limited to physical or mechanical connections, but may include electrical connections, whether direct or indirect. "Up", "Down", "Left" and "Right" are only used to indicate a relative positional relationship, and when an absolute position of the described object changes, the relative positional relationship may also change accordingly.

In some touch-display apparatuses, in order to prevent a display operation and a touch detection operation from interfering with each other, control is performed by integrated circuit (IC) chips in a time-division manner. That is, only display signals are input in a display period and only touch detection signals are input in a touch detection period. However, this may cause the display operation of the touch-display apparatuses being affected in the touch detection period.

Figure 1:
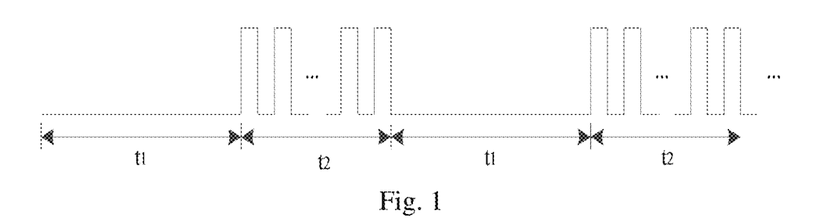
FIG. 1 illustrates a schematic diagram of a time-division control used in some touch-display apparatuses.

FIG. 1 illustrates a schematic diagram of a time-division control used in some touch-display apparatuses. In FIG. 1, the concept of the time-division control is illustrated by taking touch excitation signals (also referred to as touch detection signals) as an example. For example, taking 60 Hz as an example, an entire scanning period of one frame is 16.7 ms, the first 10 ms in the entire scanning period of this frame is the display period t1, and the last 6.7 ms in the entire scanning period of this frame is the touch detection period t2. As shown in FIG. 1, during the display period t1, only display signals are provided and no touch excitation signals are provided by the integrated circuit (IC) chips in the touch-display apparatus. During the display period t1, the touch-display apparatus is only used for display. During the touch detection period t2, only touch excitation signals are provided and no display signals are provided by the integrated circuit (IC) chips in the touch-display apparatus. A waveform of signals for the time-division control is shown in FIG. 1 and may be a square wave signal. During the touch detection period t2, because the display signals are no longer provided and a voltage of the display signals provided during the display period t1 is not sufficient to maintain a voltage required for the display operation of the touch-display apparatus during the entire touch detection period t2, the display operation of the touch-display apparatus during the touch detection period t2 will be affected. Moreover, with an improvement of a resolution of the touch-display apparatuses, this problem will become more and more serious.

According to at least one embodiment of the present disclosure, there is provided a driving method for driving a touch-display apparatus, which includes: providing a gate driving signal to gate lines, providing pixel voltages to data lines, and providing a common electrode driving signal to common electrodes, wherein a pixel driving is performed (i.e., a pixel display operation or a display operation is performed) based on the gate driving signal, the pixel voltages, and the common electrode driving signal, and a touch detection operation is simultaneously performed based on the common electrode driving signal.

In the driving method provided by at least one embodiment of the present disclosure, the pixel driving is performed based on the gate driving signal, the pixel voltages, and the common electrode driving signal, and the touch detection operation is simultaneously performed based on the common electrode driving signal, so that the effect of simultaneously performing the pixel display operation and the touch detection operation in the entire scanning period (t1+t2) of each frame is realized, and the problem that the display operation of the touch-display apparatus is affected in the touch detection period is solved.

In the following, some embodiments of the present disclosure will be described in detail with reference to the accompanying drawings. It should be noted that the same or similar reference numerals in different drawings will be used to refer to the same or similar elements.

Figure 2A:
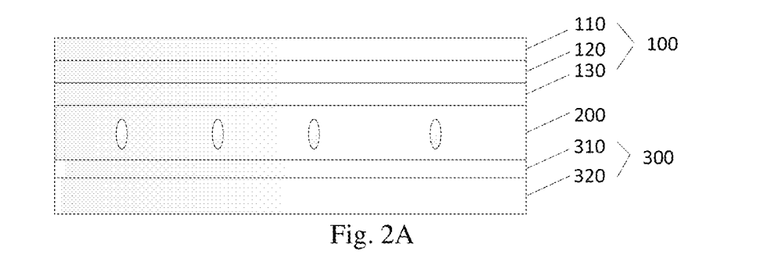
FIG. 2A is a schematic cross-sectional diagram of a touch-display apparatus according to some embodiments of the present disclosure.
Figure 2B:
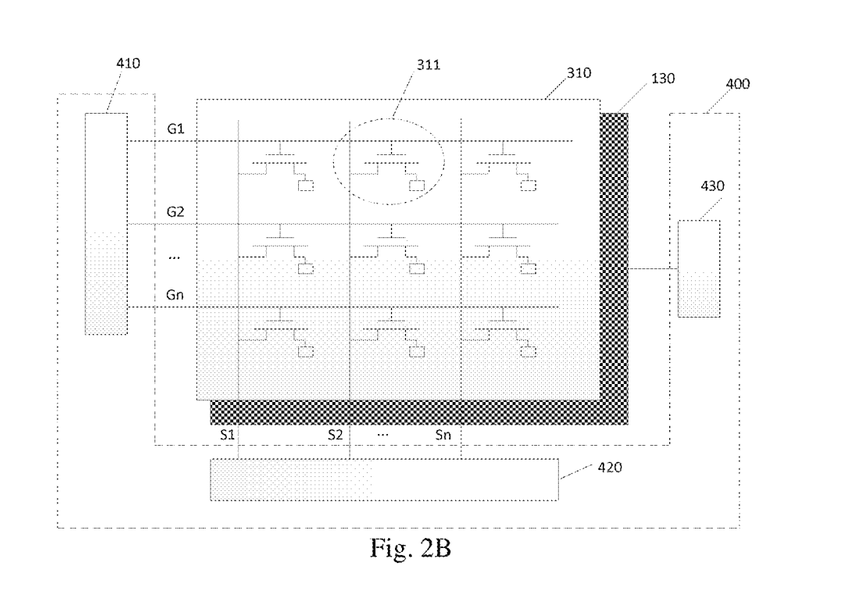
FIG. 2B is a schematic layered diagram of the touch-display apparatus according to some embodiments of the present disclosure.

FIG. 2A is a schematic cross-sectional diagram of a touch-display apparatus according to some embodiments of the present disclosure. FIG. 2B is a schematic layered diagram of the touch-display apparatus according to some embodiments of the present disclosure.

As shown in FIGS. 2A and 2B, the touch-display apparatus may include a color filter (CF) substrate 100, a liquid crystal layer 200, a thin-film transistor (TFT) substrate 300, and a driving circuit 400.

The thin-film transistor substrate 300 may include a first substrate 320 and a thin-film transistor layer 310 located above the first substrate 320.

As shown in FIG. 2B, the surface of the thin-film transistor layer 310 facing common electrodes (common electrode layer) 130 is provided with a plurality of gate lines G1, G2, . . . , Gn, a plurality of data lines S1, S2, Sn, and a plurality of thin-film transistors 311. The plurality of gate lines G1, G2, . . . , Gn are respectively electrically connected to the gates of the plurality of thin-film transistor 311 row by row, and the plurality of gate lines G1, G2, . . . , Gn are respectively connected to a first driving sub-circuit 410 included in the driving circuit 400. The first driving sub-circuit 410 may be, for example, a Gate driver On Array (GOA).

The plurality of data lines S1, S2, . . . , Sn are respectively electrically connected to the sources of the plurality of thin-film transistors 311, and the plurality of data lines S1, S2, . . . , Sn are respectively connected to a second driving sub-circuit 420 included in the driving circuit 400.

The first driving sub-circuit 410 and the second driving sub-circuit 420 are sub-circuits included in the driving circuit 400 for driving the touch-display apparatus so that the display operation and the touch detection operation do not interfere with each other. It is understood that the first driving sub-circuit 410 and the second driving sub-circuit 420 may be two independent driving sub-circuits in the driving circuit 400 as shown in FIG. 2B, or may be integrated together as one driving sub-circuit in the driving circuit 400.

Referring to FIG. 2A, the color filter substrate 100 may include the common electrodes 130, a color filter 120, and a second substrate 110.

The color filter 120 and the second substrate 110 included in the color filter substrate 100 may be a color filter and a second substrate commonly used in display apparatuses, which will not be described here.

Figure 3:
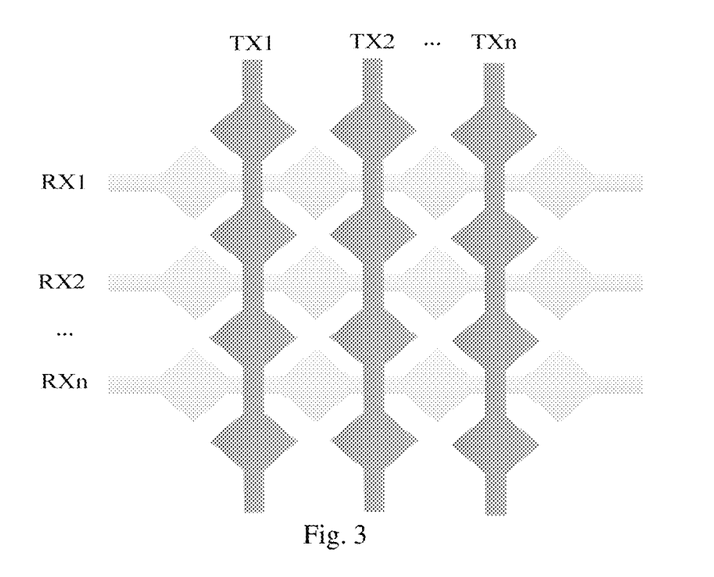
FIG. 3 illustrates a schematic diagram of common electrodes according to some embodiments of the present disclosure.

There are various implementations of the common electrodes 130. FIG. 3 illustrates a schematic diagram of common electrodes according to some embodiments of the present disclosure. The common electrodes include a plurality of rows of lateral electrodes RX1, RX2, . . . , RXn and a plurality of columns of longitudinal electrodes TX1, TX2, . . . , TXn. Each electrode of the lateral electrodes RX1, RX2, . . . , RXn and the longitudinal electrodes TX1, TX2, . . . , TXn may include a plurality of independent touch electrodes. A lateral electrode is formed by connecting the respective independent touch electrodes with each other in a lateral direction, and a longitudinal electrode is formed by connecting the respective independent touch electrodes with each other in a longitudinal direction.

The touch-display apparatus according to some embodiments of the present disclosure can perform the touch detection operation using the common electrodes. For example, the lateral electrodes or the longitudinal electrodes can respectively form a capacitance with respect to ground to form a self-capacitance, so that the touch-display apparatus according to some embodiments of the present disclosure can perform a self-capacitance-based touch detection operation using the common electrodes. For another example, the lateral electrodes and the longitudinal electrodes can form a capacitance at each intersection thereof. At each intersection of the lateral electrodes and the longitudinal electrodes, the lateral electrode and the longitudinal electrode intersecting each other form two poles of the capacitance, thereby forming a mutual-capacitance, so that the touch-display apparatus according to some embodiments of the present disclosure can perform a mutual-capacitance-based touch detection operation using the common electrodes.

Returning to FIG. 2B, as shown in FIG. 2B, the plurality of rows of lateral electrodes RX1, RX2, . . . , RXn and the plurality of columns of longitudinal electrodes TX1, TX2, . . . , TXn included in the common electrodes 130 are respectively connected to a third driving sub-circuit 430 included in the driving circuit 400 through connection lines.

Similarly, the third driving sub-circuit 430 is a sub-circuit included in the driving circuit 400 for driving the touch-display apparatus so that the display operation and the touch detection operation do not interfere with each other, and the third driving sub-circuit 430 may be an independent driving sub-circuit as shown in FIG. 2B, but may also be integrated with the first driving sub-circuit 410 and the second driving sub-circuit 420, as one driving sub-circuit in the driving circuit 400.

It can be understood that the above-described structure of the touch-display apparatus shown in FIGS. 2A-2B is for illustration only, and the structure of the touch-display apparatus provided by the embodiments of the present disclosure is not limited to the above-described structure. The touch-display apparatus formed after an addition or reduction of any device or a change in positions between components is within the protection scope of the present disclosure. For example, the touch-display apparatus may also include other devices, such as a memory, a microphone, a speaker, etc., which will not be described in detail here. For example, the position of the color filter can be changed, etc.

The driving method provided by the embodiments of the present disclosure will be described in detail below with reference to the above-described structure. It can be understood that the application of the driving method provided by the embodiments of the present disclosure in a deformed structure of the above-described structure also falls within the protection scope of the present disclosure.

Figure 4:
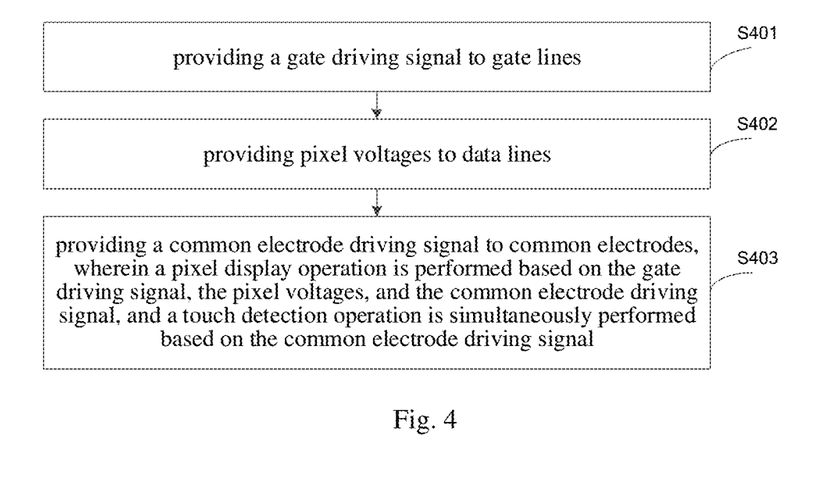
FIG. 4 illustrates a driving method according to some embodiments of the present disclosure.

FIG. 4 illustrates a driving method according to some embodiments of the present disclosure, which can be used to drive the above-described touch-display apparatus. The method comprises the following steps.

In step S401, a gate driving signal is provided to gate lines.

The gate driving signal may be a clock signal, and an amplitude and a frequency of the clock signal may be set as required. However, the gate driving signal in the embodiments of the present disclosure is not limited thereto.

Referring to FIG. 2B, the gate driving signal can be provided to the gate lines G1, G2, . . . , Gn row by row through the first driving sub-circuit 410, so that respective thin-film transistors 311 on the thin-film transistor layer 310 are turned on row by row through the gate driving signal of the gate lines G1, G2, . . . , Gn.

In step S402, pixel voltages are provided to data lines.

Referring to FIG. 2B, the pixel voltages can be provided to the data lines S1, S2, . . . , Sn through the second driving sub-circuit 420, so that the pixel voltages can be provided to the sources of respective thin-film transistors 311 through the data lines S1, S2, . . . , Sn in a state where respective thin-film transistors 311 are turned on.

In step S403, a common electrode driving signal is provided to common electrodes, wherein the pixel driving is performed based on the gate driving signal, the pixel voltages, and the common electrode driving signal; and a touch detection operation is performed simultaneously based on the common electrode driving signal.

It should be noted that steps S401-S403 may be performed out of sequence, and each step may be performed at the same time, for example, the gate driving signal is provided to a gate line and simultaneously the pixel voltages are provided to the data lines, and the common electrode driving signal is also simultaneously provided to the common electrodes. Of course, steps S401 to S403 may be performed sequentially, but the sequence is not limited to the sequence shown in FIG. 4, for example, step S403 may be performed before step S401, and the embodiments of the present disclosure are not limited thereto.

As an implementation, the common electrode driving signal can satisfy a voltage required for the pixel display operation and a signal waveform required for the touch detection operation, so that when performing the pixel display operation, the touch-display apparatus is able to turn on the thin-film transistors row by row based on the gate driving signal, to drive pixels according to voltage differences between the pixel voltages and the voltage of the common electrode driving signal, and to realize the touch detection operation after providing the common electrode driving signal to the common electrodes.

Figure 5:
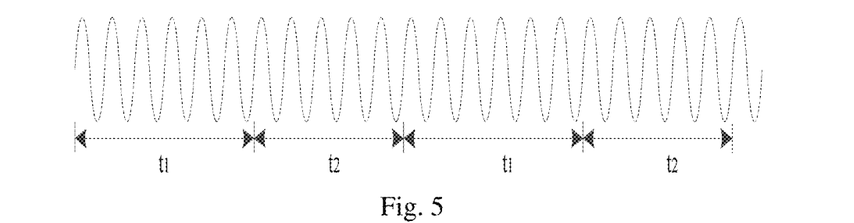
FIG. 5 illustrates a schematic diagram of a common electrode driving signal according to some embodiments of the present disclosure.

FIG. 5 illustrates a schematic diagram of a common electrode driving signal according to some embodiments of the present disclosure. Referring to FIGS. 2B and 5, in the entire scanning period (including t1 and t2) of each frame, the common electrode driving signal as shown in FIG. 5 can be provided to the common electrodes 130 through the third driving sub-circuit 430, and the common electrode driving signal can satisfy the voltage required for the pixel display operation and the signal waveform required for the touch detection, for example, as shown in FIG. 5, the common electrode driving signal is a sinusoidal signal.

The principle that the touch-display apparatus can perform the pixel driving based on the gate driving signal, the pixel voltages, and the common electrode driving signal and simultaneously perform the touch detection operation based on the common electrode driving signal will be described in detail below.

Figure 6:
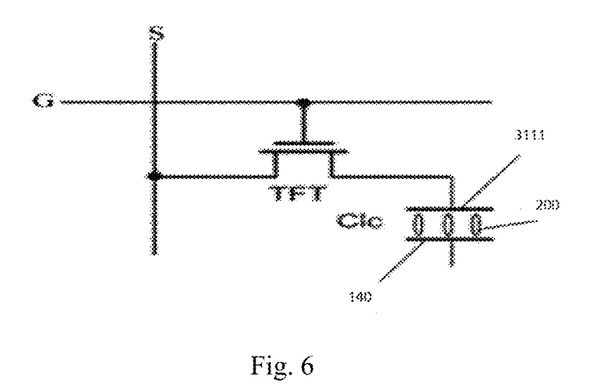
FIG. 6 illustrates a schematic diagram of a principle of how to perform a pixel driving in the touch-display apparatus according to some embodiments of the present disclosure.

Please refer to FIG. 6, which illustrates a schematic diagram of a principle for performing a pixel driving by the touch-display apparatus.

The driving circuit provides a gate driving signal to the gate line G so that a thin-film transistor TFT is turned on by the gate driving signal provided from the gate line. The driving circuit provides a pixel voltage to a data line S so that the pixel voltage is provided to the pixel electrode 3111 of each sub-pixel when the thin-film transistor is turned on, such that the pixel voltage is provided to the pixel electrode 3111 of the thin-film transistor TFT through the data line S in a state where the thin-film transistor TFT is turned on. The driving circuit provides a common electrode driving signal to a common electrode 130. When a voltage difference between the pixel voltage at the pixel electrode 3111 and the common electrode 130 satisfies a certain requirement, the liquid crystal 200 is enabled to display normally.

Meanwhile, the touch-display apparatus can perform a self-capacitance-based touch detection operation based on the common electrode driving signal. Taking FIG. 3 as an example, the driving circuit may provide a gate driving signal to gate lines G1, G2, . . . , Gn row by row, provide pixel voltages to data lines S1, S2, . . . , Sn, provide a common electrode driving signal to lateral electrodes RX1, RX2, . . . , RXn of the common electrodes row by row and simultaneously provide a common electrode driving signal to longitudinal electrodes TX1, TX2, . . . , TXn of the common electrodes, and detect an output signal of the lateral electrodes RX1, RX2, . . . , RXn of the common electrodes row by row and detect an output signal of the longitudinal electrodes TX1, TX2, . . . , TXn of the common electrodes column by column. The timing of providing the gate driving signal to the gate lines G1, G2, . . . , Gn row by row may be matched with the timing of providing the common electrode driving signal to the lateral electrodes RX1, RX2, . . . , RXn of the common electrodes row by row. For example, when the gate driving signal is provided to the gate line G1, the common electrode driving signal is simultaneously provided to the lateral electrode RX1 of the common electrodes.

Alternatively, the common electrode driving signal is simultaneously provided to the plurality of lateral electrodes RX1, RX2, . . . , RXn and the plurality of longitudinal electrodes TX1, TX2, . . . , TXn of the common electrodes, and the output signal of the lateral electrodes RX1, RX2, . . . , RXn of the common electrodes is detected row by row, and the output signal of the longitudinal electrodes TX1, TX2, . . . , TXn of the common electrodes is detected column by column. Combining results of the row by row detection and the column by column detection, the location of a touch point can be positioned.

As another implementation, the touch-display apparatus can also perform the pixel driving based on the gate driving signal, the pixel voltages, and the common electrode driving signal and simultaneously perform a mutual-capacitance-based touch detection operation based on the common electrode driving signal. Taking FIG. 3 as an example, the driving circuit may provide the gate driving signal to the gate lines G1, G2, . . . , Gn row by row, and accordingly provide the common electrode driving signal to the lateral electrodes RX1, RX2, . . . , RXn row by row (for example, when the gate driving signal is provided to the gate line G1, the common electrode driving signal is simultaneously provided to the lateral electrode RX1 of the common electrode), provide the pixel voltages to the data lines S1, S2, . . . , Sn. When the common electrode driving signal is provided to the lateral electrodes RX1, RX2, . . . , RXn of the common electrodes row by row, the output signal of the longitudinal electrodes TX1, TX2, . . . , TXn is detected column by column or simultaneously, and the touch detection operation is performed based on the detected output signal. According to a result of the detection, the position of the touch point can be positioned.

The plurality of lateral electrodes and the gate rows may be in one-to-one correspondence relationship or in a relationship that one lateral electrode may correspond to more than one gate row. When one lateral electrode corresponds to more than one gate row, the accuracy of the touch detection is improved.

In summary, because a waveform of the common electrode driving signal in the period t1 and a waveform of the common electrode driving signal in the period t2 are consistent, there is no need to perform the time-division control, and the common electrode driving signal is provided to the common electrode in the entire scanning period (t1+t2). The touch-display apparatus can perform the pixel display operation based on the gate driving signal, the pixel voltages, and the common electrode driving signal, and simultaneously perform the touch detection operation based on the common electrode driving signal, so that in the entire scanning period of each frame, not only can the normal display operation of the touch-display apparatus be ensured, but also the touch detection operation can be accurately performed, thus solving the problem that the display operation of the touch-display apparatus is affected in the touch detection period.

Furthermore, the accuracy of the touch detection can be further improved by setting the common electrode driving signal as a sine wave signal or a cosine wave signal. Of course, the common electrode driving signal may also be a square wave signal, and embodiments of the present disclosure are not limited thereto.

Further, the amplitude and frequency of the sine wave signal or the cosine wave signal can be set as required. For example, the amplitude of the sine wave signal or the cosine wave signal may be set to a range from 0.01V to 1.2V. In this range of the amplitude, the normal display operation of the touch-display apparatus can be ensured and the touch detection operation can be performed more accurately in the entire scanning period of each frame. Of course, the embodiments of the present disclosure are not limited thereto, and larger or smaller amplitudes are within the protection scope of the present disclosure.

Alternatively, the frequency of the sine wave signal or the cosine wave signal may be greater than a preset frequency, so that the higher the frequency of the sine wave signal or the cosine wave signal is, the higher a burst point rate (e.g., the effective points that can be detected when a touch occurs) can be ensured while the normal display operation of the touch-display apparatus is ensured.

In the driving method provided by at least one embodiment of the present disclosure, the pixel display operation is performed based on the gate driving signal, the pixel voltages, and the common electrode driving signal, and the touch detection operation is simultaneously performed based on the common electrode driving signal, so that in the entire scanning period of each frame, the effect of simultaneously performing the pixel display operation and the touch detection operation is realized by inputting the common electrode driving signal capable of satisfying requirements of the pixel display operation and the touch detection operation, and the problem that the display operation of the touch-display apparatus is affected in the touch detection period is solved. In addition, when the frequency of the sine wave signal or the cosine wave signal as the common electrode driving signal is higher, the higher the burst point rate can be ensured.

Figure 7A:
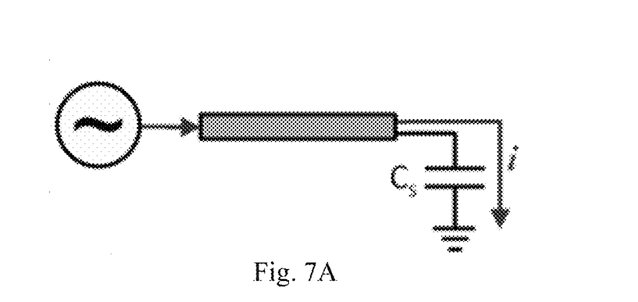
FIG. 7A illustrates a diagram of a working principle of a common electrode included in the touch-display apparatus when no touch occurs according to some embodiments of the present disclosure.
Figure 7B:
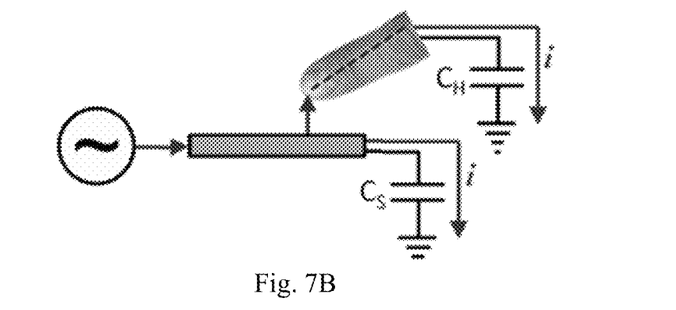
FIG. 7B illustrates a diagram of a working principle of a common electrode included in the touch-display apparatus when touch occurs according to some embodiments of the present disclosure.
Figure 8:
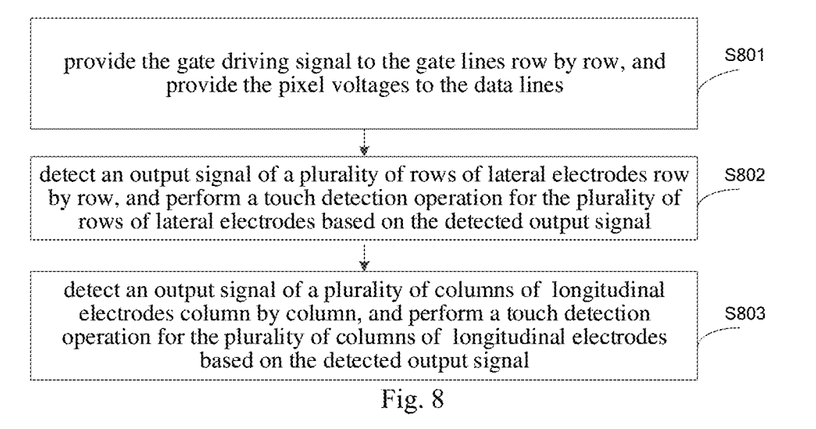
FIG. 8 illustrates another driving method according to some embodiments of the present disclosure.

FIG. 7A illustrates a diagram of a working principle of the common electrode included in the touch-display apparatus when no touch occurs according to some embodiments of the present disclosure; FIG. 7B illustrates a diagram of a working principle of the common electrode included in the touch-display apparatus when touch occurs according to some embodiments of the present disclosure; and FIG. 8 illustrates another driving method according to some embodiments of the present disclosure.

In the following, another driving method according to some embodiments of the present disclosure will be described in detail with reference to FIGS. 7A, 7B and 8.

The driving method can be used to drive the touch-display apparatus, so that the touch-display apparatus can perform pixel driving based on the gate driving signal, the pixel voltages and the common electrode driving signal and simultaneously perform the self-capacitance-based touch detection operation based on the common electrode driving signal.

Referring to FIGS. 7A-7B, the principle of performing the self-capacitance-based touch detection operation based on the common electrode driving signal will be described first.

The lateral electrodes and the longitudinal electrodes included in the common electrodes can respectively form a capacitance with respect to ground to form a self-capacitance. Take one of the lateral electrodes and longitudinal electrodes as an example, as shown in FIG. 7A, when no touch occurs, the capacitance of the common electrode with respect to ground is Cs, and as shown in FIG. 7B, when a touch occurs in the touch-display apparatus, the capacitance Cs of the common electrode with respect to ground is parallel with a capacitance $C_H$ which is also formed between the common electrode and ground, i.e., when the touch occurs in the touch-display apparatus, the capacitance of the common electrode with respect to ground changes. Therefore, when the touch occurs, the driving circuit meanwhile provides the common electrode driving signal to the common electrode, an output signal from the one of the lateral electrodes and longitudinal electrodes will be inconsistent with the provided common electrode driving signal, and a position where the touch occurs can be detected based on the detected output signal, that is, the touch-display apparatus can perform the touch detection operation based on the common electrode driving signal.

Based on the above principle, another driving method according to some embodiments of the present disclosure can perform the self-capacitance-based touch detection operation based on the common electrode driving signal. Referring to FIG. 8, the driving method includes the following steps.

In step S801, a gate driving signal is provided to a gate line row by row, and pixel voltages are provided to data lines.

In step S802, an output signal of lateral electrodes is detected row by row, and a touch detection for the lateral electrodes is performed based on the detected output signal.

In step S803, an output signal of the longitudinal electrodes is detected column by column, and a touch detection for the longitudinal electrodes is performed based on the detected output signal.

It can be understood that the embodiments of the present disclosure does not limit a sequence of performing steps S802 to S803. For example, steps S802 and S803 may be performed simultaneously or sequentially. As another example, step S803 is performed before step S802, and so on.

The process of performing the pixel driving based on the gate driving signal, the pixel voltages and the common electrode driving signal in the entire process is similar to that in the previous embodiment, and will not be repeatedly described here.

An operation process of the self-capacitance-based touch detection operation using the common electrode will be described in detail below with reference to FIGS. 3 and 5.

First, a gate driving signal is provided to gate lines G1, G2, . . . , Gn row by row, and pixel voltages is provided to data lines S1, S2, . . . , Sn. A common electrode driving signal shown in FIG. 5 is provided row by row to lateral electrodes RX1, RX2, . . . , RXn of the common electrodes and simultaneously the common electrode driving signal is provided to longitudinal electrodes TX1, TX2, . . . , TXn of the common electrodes. Alternately, the common electrode driving signal shown in FIG. 5 is simultaneously provided to the plurality of lateral electrodes RX1, RX2, . . . , RXn and the plurality of longitudinal electrodes TX1, TX2, . . . , TXn of the common electrodes.

Next, an output signal of the lateral electrodes RX1, RX2, . . . , RXn of the common electrodes is detected row by row, and a touch detection for the lateral electrodes RX1, RX2, . . . , RXn is performed based on the detected output signal. For example, it is detected whether the output signal and the provided common electrode driving signal have the same waveform or amplitude. Based on the above detection, the lateral coordinate of the location where the touch occurs can be determined.

In addition, an output signal of the longitudinal electrodes TX1, TX2, . . . , TXn is detected column by column, and a touch detection for the longitudinal electrodes TX1, TX2, . . . , TXn is performed based on the detected output signal. For example, it is detected whether the output signal and the provided common electrode driving signal have the same waveform or amplitude. Based on the above detection, the longitudinal coordinate of the location where the touch occurs can be determined.

When the lateral coordinate and longitudinal coordinate of the location where the touch occurs are determined, the location on the touch-display apparatus where the touch occurs is also determined.

There are many ways to obtain the common electrode driving signal used in the above process, for example, a prepared common electrode driving signal can be directly provided to the common electrode. An original digital electrical signal can also be phase modulated using a carrier wave to obtain the common electrode driving signal. The carrier wave may be, for example, a sine wave signal or a cosine wave signal. One example will be described in the following.

For example, assuming that the original digital electrical signal is 0 or 1, the original digital electrical signal 0 is phase modulated using a carrier wave (e.g., a sine wave signal) to obtain a sine wave signal with an initial phase of 7E corresponding to the original digital electrical signal 0, and, the original digital electrical signal 1 is phase modulated using a carrier wave (e.g., a sine wave signal) to obtain a sine wave signal with an initial phase of 0 corresponding to the original digital electrical signal 1.

It can be understood that the above is only an illustrative example of obtaining the common electrode driving signal, and the common electrode driving signal obtained by any modulation method is within the protection scope of the present disclosure.

If the common electrode driving signal is obtained by phase modulating the original digital electrical signal using a carrier wave, the output signal is recovered into a digital electrical signal through a phase demodulation after the output signal is detected. For example, a sine wave signal with an initial phase of $\pi$ is recovered into a digital electrical signal 0, and a sine wave signal with an initial phase of 0 is recovered into a digital electrical signal 1.

Further, the touch detection operation can be performed based on a difference between a number or a density of high and low levels included in the recovered digital electrical signal and a number or a density of high and low levels included in the original digital electrical signal.

For example, if the number of high level 1 included in the recovered digital electrical signal is 9, the number of low level 0 is 1, and the number of high level 1 included in the original digital electrical signal is 3, and the number of low level 0 is 7, at this time, because the number of high level 1 and the number of low level 0 included in the recovered digital electrical signal are inconsistent with the number of high level and the number of low level included in the original digital electrical signal, it can be determined that the output signal is inconsistent with the provided common electrode driving signal, thereby determining that the touch has occurred.

For another example, if the recovered digital electrical signal is 111110000 while the original digital electrical signal is 10101010, at this time, because the density of high level 1 and the density of low level 0 included in the recovered digital electrical signal are inconsistent with the density of high level 1 and the density of low level 0 included in the original digital electrical signal, it can be determined that the output signal is inconsistent with the provided common electrode driving signal, thereby determining that the touch has occurred.

Through the above-described manner, an analog signal is demodulated into a digital signal, thus simplifying the detection operation and further improving the touch detection efficiency.

In the driving method provided by at least one embodiment of the present disclosure, the effect of simultaneously performing the pixel display operation and the self-capacitance based touch detection operation is realized, and the problem that the display operation of the touch-display apparatus is affected in the touch detection period is solved. In addition, the analog signal is demodulated into the digital signal, thus simplifying the detection operation and improving the touch detection efficiency.

Figure 9A:
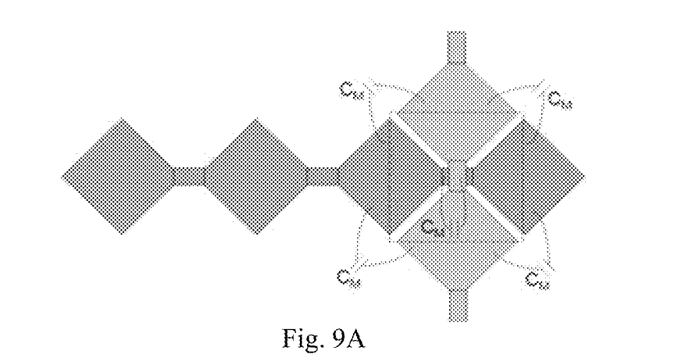
FIG. 9A illustrates a diagram of a working principle of the common electrodes according to some embodiments of the present disclosure.
Figure 9B:
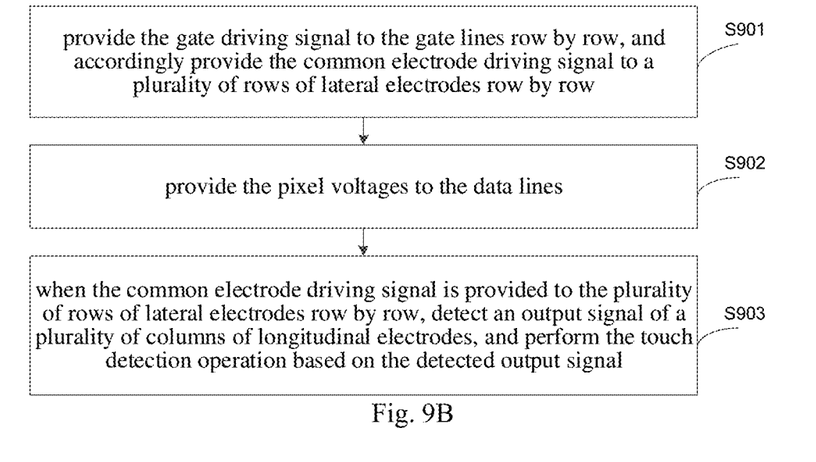
FIG. 9B illustrates yet another driving method according to some embodiments of the present disclosure.

FIG. 9A illustrates a diagram of a working principle of the common electrode according to some embodiments of the present disclosure; FIG. 9B illustrates yet another driving method according to some embodiments of the present disclosure.

In the following, another driving method according to some embodiments of the present disclosure will be described in detail with reference to FIGS. 9A-9B. The driving method can be used to drive the above-described touch-display apparatus, so that the touch-display apparatus can perform pixel display operation based on the gate driving signal, the pixel voltages, and the common electrode driving signal and simultaneously perform the mutual-capacitance-based touch detection operation based on the common electrode driving signal.

Referring to FIG. 9A, the principle of performing the mutual-capacitance-based touch detection operation based on the common electrode driving signal will be described first.

As shown in FIG. 9A, the lateral electrodes and the longitudinal electrodes can form a capacitance at each intersection thereof. At each intersection of the lateral electrodes and the longitudinal electrodes, the lateral electrode and the longitudinal electrode intersecting each other form two poles of the capacitance, thereby forming a mutual-capacitance $C_M$. When a finger touches the touch-display apparatus, the coupling between the two electrodes (the lateral electrode and the longitudinal electrode) near the touch point is affected, so that the capacitance $C_M$ between the two electrodes changes. When each row of lateral electrodes is scanned with the common electrode driving signal, output signals of all longitudinal electrodes are respectively received, and when the finger touches the touch-display apparatus, the output signals also change due to the change of capacitance $C_M$ between the two electrodes near the touch point. The touch detection operation based on the detected output signals can determine whether the touch has occurred, and the coordinates of each touch point can be calculated according to capacitance variation data. Even if there are a plurality of touch points, the real coordinates of each touch point can be calculated.

Based on the above principles, the other driving method according to some embodiments of the present disclosure can perform the mutual-capacitance-based touch detection operation based on the common electrode driving signal. Referring to FIG. 9B, the driving method includes the following steps.

In step S901, a gate driving signal is provided to gate lines row by row, and a common electrode driving signal is accordingly provided to lateral electrodes row by row.

In step S902, pixel voltages are provided to data lines.

In step S903, when the common electrode driving signal is provided to the lateral electrodes row by row, an output signal of all the longitudinal electrodes is detected, and a touch detection operation is performed based on the detected output signal.

It can be understood that the embodiments of the present disclosure do not limit the sequence of performing steps S901 to S902, and steps S901 to S902 can be performed sequentially or simultaneously.

The process of performing the pixel driving based on the gate driving signal, the pixel voltages and the common electrode driving signal in the entire process is similar to that in the previous embodiment, and will not be repeatedly described here.

The process of performing the mutual-capacitance-based touch detection operation using the common electrode will be described in detail below with reference to FIGS. 3 and 5.

A gate driving signal may be provided to gate lines G1, G2, . . . , Gn row by row, and a common electrode driving signal as shown in FIG. 5 may be accordingly provided to lateral electrodes RX1, RX2, . . . , RXn row by row (for example, when the gate driving signal is provided to the gate line G1, the common electrode driving signal is simultaneously provided to the lateral electrode RX1 of the common electrodes), pixel voltages are provided to data lines S1, S2, . . . , Sn. When the common electrode driving signal is provided to the lateral electrodes RX1, RX2, . . . , RXn of the common electrodes row by row, an output signal of the longitudinal electrodes TX1, TX2, . . . , TXn is detected column by column or output signals of the longitudinal electrodes TX1, TX2, . . . , TXn are detected simultaneously, and the touch detection operation is performed based on the detected output signal. For example, it is detected whether the output signal and the provided common electrode driving signal have the same waveform or amplitude. Based on the above detection, the lateral coordinate and the longitudinal coordinate of the location where the touch occurs can be determined simultaneously.

When the lateral coordinate and the longitudinal coordinate of the location where the touch occurs are determined, the location where the touch occurs on the touch-display apparatus is also determined. Moreover, it can be understood that the touch detection operation based on the detected output signal is also similar to the process in the previous embodiment, and will not be repeatedly described here.

In the driving method provided by at least one embodiment of the present disclosure, the effect of simultaneously performing the pixel display operation and the mutual-capacitance-based touch detection operation is realized, and the problem that the display operation of the touch-display apparatus is affected in the touch detection period is solved. In addition, the analog signal is demodulated into the digital signal, thus simplifying the detection operation and improving the touch detection efficiency.

It can be understood that the steps of the driving methods provided in the above embodiments can be added, deleted, exchanged, or combined, etc., and the driving methods after being added, deleted, exchanged, or combined, etc. all fall within the protection scope of the present disclosure. For example, the step of performing the touch detection operation based on the difference between the number or the density of high and low levels included in the recovered digital electrical signal and the number or the density of high and low levels included in the original digital electrical signal can also be used in the first embodiment or the third embodiment. For another example, the step of the original digital electrical signal being phase modulated using the carrier wave to obtain the common electrode driving signal can also be used in the first embodiment, etc.

Figure 10:
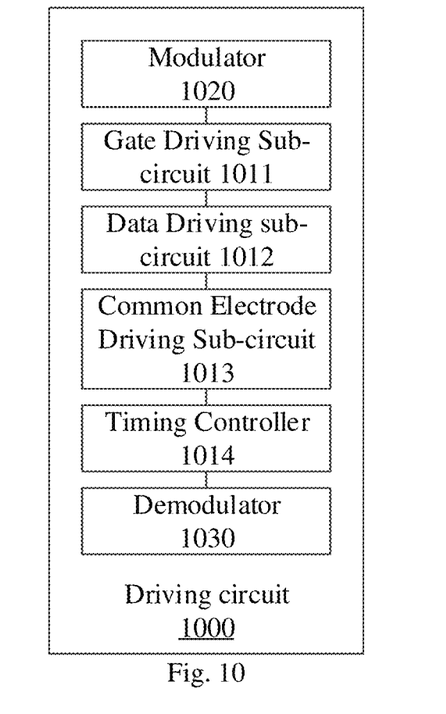
FIG. 10 illustrates a driving circuit according to some embodiments of the present disclosure.

FIG. 10 illustrates a driving circuit according to some embodiments of the present disclosure. The driving circuit 1000 includes: a gate driving sub-circuit 1011 configured to provide a gate driving signal to gate lines; a data driving sub-circuit 1012 configured to provide pixel voltages to data lines; a common electrode driving sub-circuit 1013 configured to provide a common electrode driving signal to common electrodes, wherein the pixel driving is performed based on the gate driving signal, the pixel voltages, and the common electrode driving signal, and simultaneously a touch detection operation is performed based on the common electrode driving signal; and a timing controller 1014 configured to control a timing of providing the gate driving signal to the gate lines, providing the pixel voltages to the data lines, and providing the common electrode driving signal to the common electrodes.

For example, the common electrode driving signal can satisfy a voltage required for the pixel display operation and a signal waveform required for touch detection.

For example, the common electrode driving signal may include a sine wave signal or a cosine wave signal.

For example, an amplitude of the sine wave signal or the cosine wave signal may include a range of 0.01V to 1.2V.

For example, a frequency of the sine wave signal or the cosine wave signal may be greater than a preset frequency.

For example, the common electrode of the touch-display apparatus comprises a plurality of rows of lateral electrodes and a plurality of columns of longitudinal electrodes, and the driving sub-circuit (including a gate driving sub-circuit 1011, a data driving sub-circuit 1012, and a common electrode driving sub-circuit 1013) can also be used to: provide the gate driving signal to the gate lines row by row, and provide the pixel voltages to the data lines; detect an output signal of lateral electrodes row by row, and perform a touch detection operation for the lateral electrodes based on the detected output signal; detect an output signal of longitudinal electrodes column by column, and perform a touch detection operation for the longitudinal electrodes based on the detected output signal.

For example, the common electrodes of the touch-display apparatus comprise a plurality of rows of lateral electrodes and a plurality of columns of longitudinal electrodes, and the driving sub-circuit (including the gate driving sub-circuit 1011, the data driving sub-circuit 1012, and the common electrode driving sub-circuit 1013) can also be used to: provide the gate driving signal to the gate lines row by row, and accordingly provide the common electrode driving signal to lateral electrodes row by row; provide the pixel voltages to the data lines, and when the common electrode driving signal is provided to the lateral electrodes row by row, detect an output signal of longitudinal electrodes, and perform the touch detection operation based on the detected output signal.

Figure 11:
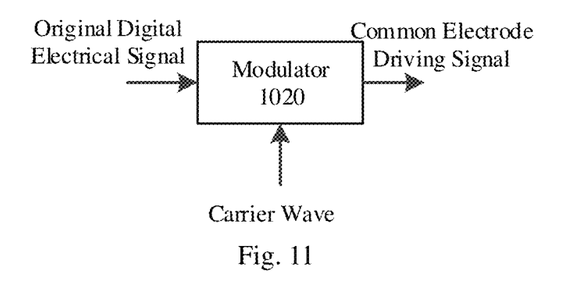
FIG. 11 illustrates a diagram of a working principle of modulator 1020.

For example, the driving circuit 1000 may further include a modulator 1020. FIG. 11 illustrates a diagram of a working principle of the modulator 1020. As shown in FIG. 11, the modulator 1020 can be used to phase modulate an original digital electrical signal using a carrier wave to obtain the common electrode driving signal.

Figure 12:
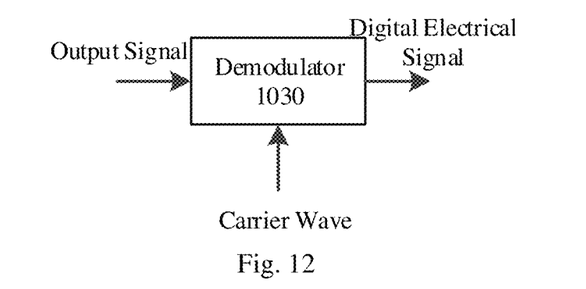
FIG. 12 illustrates a diagram of a working principle of demodulator 1030.

For example, the driving circuit 1000 may further include a demodulator 1030. FIG. 12 illustrates a diagram of a working principle of the demodulator 1030. As shown in FIG. 12, the demodulator 1030 can be used to recover the output signal into a digital electrical signal through a phase demodulation.

For example, the driving sub-circuit (including the gate driving sub-circuit 1011, the data driving sub-circuit 1012, and the common electrode driving sub-circuit 1013) can also be used to perform the touch detection operation based on a difference between a number or a density of high and low levels included in the recovered digital electrical signal and a number or a density of high and low levels included in the original digital electrical signal.

For example, the carrier wave may include a sine wave signal or a cosine wave signal.

In the driving circuit provided by at least one embodiment of the present disclosure, the pixel driving is performed based on the gate driving signal, the pixel voltages, and the common electrode driving signal, and the touch detection operation is simultaneously performed based on the common electrode driving signal, so that in the entire scanning period of each frame, the effect of simultaneously performing the pixel display operation and the touch detection operation is realized by inputting the common electrode driving signal capable of satisfying requirements of the pixel display operation and the touch detection operation, and the problem that the display operation of the touch-display apparatus is affected in the touch detection period is solved. In addition, when the frequency of the sine wave signal or the cosine wave signal as the common electrode driving signal is faster, the higher the burst point rate can be ensured. Furthermore, the effect that the pixel display operation and the self-capacitance/mutual-capacitance based touch detection operation can be simultaneously performed is also realized, and the problem that the display operation of the touch-display apparatus is affected in the touch detection period is solved. In addition, an analog signal is demodulated into a digital signal, thus simplifying the detection operation and improving the touch detection efficiency.

According to some embodiments of the present disclosure, there is also provided a touch-display apparatus for realizing the touch detection and the display, and the touch-display apparatus includes the driving circuit as described above. The touch-display apparatus may further include common electrodes including a plurality of rows of lateral electrodes and a plurality of columns of longitudinal electrodes.

In the touch-display apparatus provided by at least one embodiment of the present disclosure, the pixel driving is performed based on the gate driving signal, the pixel voltages, and the common electrode driving signal; and a touch detection operation is simultaneously performed based on the common electrode driving signal, so that in the entire scanning period of each frame, the effect of simultaneously performing the pixel display operation and the touch detection operation by inputting the common electrode driving signal capable of satisfying requirements of the pixel display operation and the touch detection operation is realized, and the problem that the display operation of the touch-display apparatus is affected in the touch detection period is solved.

The driving circuit and the touch-display apparatus provided by at least one embodiment of the present disclosure have the same implementation principle and produced technical effects as those of the previous embodiments described as methods. For brief description, please refer to the corresponding contents of the previous embodiments described as the methods.

It should be noted that various embodiments in this specification are described in a progressive manner, each embodiment focuses on the differences from other embodiments, and the same and similar parts between various embodiments can be referred to each other.

The above description illustrates only specific embodiments of the present disclosure, but the protection scope of the present disclosure is not limited thereto, and the protection scope of the present disclosure should be defined by the protection scope of the claims.

What is claimed is:

1. A driving method for driving a touch-display apparatus, the method comprising:
   providing a gate driving signal to gate lines,
   providing pixel voltages to data lines, and
   providing a common electrode driving signal to common electrodes,
   performing a touch detection operation based on the common electrode driving signal meanwhile performing a pixel display operation based on the gate driving signal, the pixel voltages, and the common electrode driving signal,
   wherein in each display frame, the touch detection operation and the pixel display operation are performed simultaneously.

2. The driving method according to claim 1, wherein the common electrodes of the touch-display apparatus comprise a plurality of rows of lateral electrodes and a plurality of columns of longitudinal electrodes, wherein,
   the gate driving signal is provided to the gate lines row by row, and the pixel voltages are provided to the data lines;
   an output signal of the plurality of rows of lateral electrodes is detected row by row, and a touch detection operation for the plurality of rows of lateral electrodes is performed based on the detected output signal;
   an output signal of the plurality of columns of longitudinal electrodes is detected column by column, and a touch detection operation for the plurality of columns of longitudinal electrodes is performed based on the detected output signal.

3. The driving method according to claim 1, wherein the common electrodes of the touch-display apparatus comprise a plurality of rows of lateral electrodes and a plurality of columns of longitudinal electrodes, wherein,
   the gate driving signal is provided to the gate lines row by row, and accordingly the common electrode driving signal is provided to the plurality of rows of lateral electrodes row by row;
   the pixel voltages are provided to the data lines; and
   when the common electrode driving signal is provided to the plurality of rows of lateral electrodes row by row, an output signal of the plurality of columns of longitudinal electrodes is detected, and the touch detection operation is performed based on the detected output signal.

4. The driving method according to claim 1, wherein the common electrode driving signal is obtained by:
   performing a phase modulation on an original digital electrical signal using a carrier wave to obtain the common electrode driving signal.

5. The driving method according to claim 4, wherein performing the touch detection operation based on the detected output signal comprises:
   recovering the detected output signal into a digital electrical signal through a phase demodulation;
   performing the touch detection operation based on a difference between a number or a density of high and low levels included in the recovered digital electrical signal and a number or a density of high and low levels included in the original digital electrical signal.

6. The driving method according to claim 1, wherein the common electrode driving signal satisfies a voltage required for the pixel display operation and a signal waveform required for the touch detection operation.

7. The driving method according to claim 1, wherein the common electrode driving signal includes a sine wave signal or a cosine wave signal.

8. A driving circuit for driving a touch-display apparatus, the driving circuit comprising:
   a driving sub-circuit, configured to provide a gate driving signal to gate lines, to provide pixel voltages to data lines, to provide a common electrode driving signal to common electrodes, and to perform a touch detection operation based on the common electrode driving signal meanwhile performing a pixel display operation based on the gate driving signal, the pixel voltages, and the common electrode driving signal,
   wherein in each display frame, the touch detection operation and the pixel display operation are performed simultaneously.

9. The driving circuit according to claim 8, wherein the common electrodes of the touch-display apparatus comprise a plurality of rows of lateral electrodes and a plurality of columns of longitudinal electrodes, and the driving sub-circuit is further configured to:
   provide the gate driving signal to the gate lines row by row, and provide the pixel voltages to the data lines;
   detect an output signal of the plurality of rows of lateral electrodes row by row, and perform a touch detection operation for the plurality of rows of lateral electrodes based on the detected output signal; and
   detect an output signal of the plurality of columns of longitudinal electrodes column by column, and perform a touch detection operation for the plurality of columns of longitudinal electrodes based on the detected output signal.

10. The driving circuit according to claim 8, wherein the common electrodes of the touch-display apparatus comprise a plurality of rows of lateral electrodes and a plurality of columns of longitudinal electrodes, and the driving sub-circuit is further configured to:
    provide the gate driving signal to the gate lines row by row, and accordingly provide the common electrode driving signal to the plurality of rows of lateral electrodes row by row;
    provide the pixel voltages to the data lines; and
    when the common electrode driving signal is provided to the plurality of rows of lateral electrodes row by row, detect an output signal of the plurality of columns of longitudinal electrodes, and perform the touch detection operation based on the detected output signal.

11. The driving circuit according to claim 8, further comprising:
   a modulator, configured to phase modulate an original digital electrical signal using a carrier wave to obtain the common electrode driving signal.

12. The driving circuit according to claim 11, further comprising:
   a demodulator, configured to recover the detected output signal into a digital electrical signal through a phase demodulation;
   wherein, the driving sub-circuit is further configured to:
   perform the touch detection operation based on a difference between a number or a density of high and low levels included in the recovered digital electrical signal and a number or a density of high and low levels included in the original digital electrical signal.

13. The driving circuit according to claim 8 wherein the common electrode driving signal satisfies a voltage required for the pixel display operation and a signal waveform required for the touch detection operation.

14. The driving circuit according to claim 8, wherein the common electrode driving signal includes a sine wave signal or a cosine wave signal.

15. A touch-display apparatus for realizing a touch detection operation and a display operation, comprising:
   a driving circuit according to claim 8.

* * * * *